US010885262B1

(12) United States Patent
Adolf et al.

(10) Patent No.: US 10,885,262 B1
(45) Date of Patent: Jan. 5, 2021

(54) SYSTEMS AND METHODS FOR DETERMINING FABRICATION LOSS OF SEGMENTED DESIGNS USING PAINTBRUSH PATTERNS

(71) Applicant: X Development LLC, Mountain View, CA (US)

(72) Inventors: Brian Adolf, San Mateo, CA (US); Jesse Lu, Hollister, CA (US); Martin Schubert, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/796,500

(22) Filed: Feb. 20, 2020

(51) Int. Cl.
*G06F 30/398* (2020.01)
*G06F 119/18* (2020.01)

(52) U.S. Cl.
CPC ........ *G06F 30/398* (2020.01); *G06F 2119/18* (2020.01)

(58) Field of Classification Search
CPC ............................ G06F 30/398; G06F 2119/18
USPC ......................................................... 716/112
See application file for complete search history.

(56) References Cited

U.S. PATENT DOCUMENTS

| 2006/0080634 | A1* | 4/2006 | Beale ................... | G03F 7/705 716/53 |
| 2006/0088200 | A1* | 4/2006 | Du ...................... | G06T 7/001 382/144 |
| 2006/0242618 | A1 | 10/2006 | Wang et al. | |
| 2009/0083692 | A1* | 3/2009 | Rieger .................. | G06F 30/39 716/51 |
| 2010/0203430 | A1* | 8/2010 | Ye ....................... | G03F 7/70433 430/5 |
| 2018/0095359 | A1* | 4/2018 | Jeong ................... | G06F 17/14 |

OTHER PUBLICATIONS

Mack, C., "Fundamental Principles of Optical Lithography," 2008, p. 425.
Vercruysse, D. et al., "Analytical Level Set Fabrication Constraints for Inverse Design," Scientific Reports, 9:8999, Jun. 21, 2019, pp. 1-7.

* cited by examiner

*Primary Examiner* — Suresh Memula
(74) *Attorney, Agent, or Firm* — Christensen O'Connor Johnson Kindness PLLC

(57) ABSTRACT

In some embodiments, a design verification system is provided that is configured to perform actions for ensuring fabricability of a segmented design. The design verification system searches a proposed segmented design for a paintbrush pattern to determine a positive paintbrush loss, and searches for an inverse paintbrush pattern to determine a negative paintbrush loss. The design verification system combines the positive paintbrush loss and the negative paintbrush loss to obtain a total paintbrush loss that indicates whether or not the proposed segmented design is fabricable. If the total paintbrush loss indicates that the proposed segmented design is not fabricable, the design verification system updates the proposed segmented design based on a gradient of the total paintbrush loss.

20 Claims, 9 Drawing Sheets

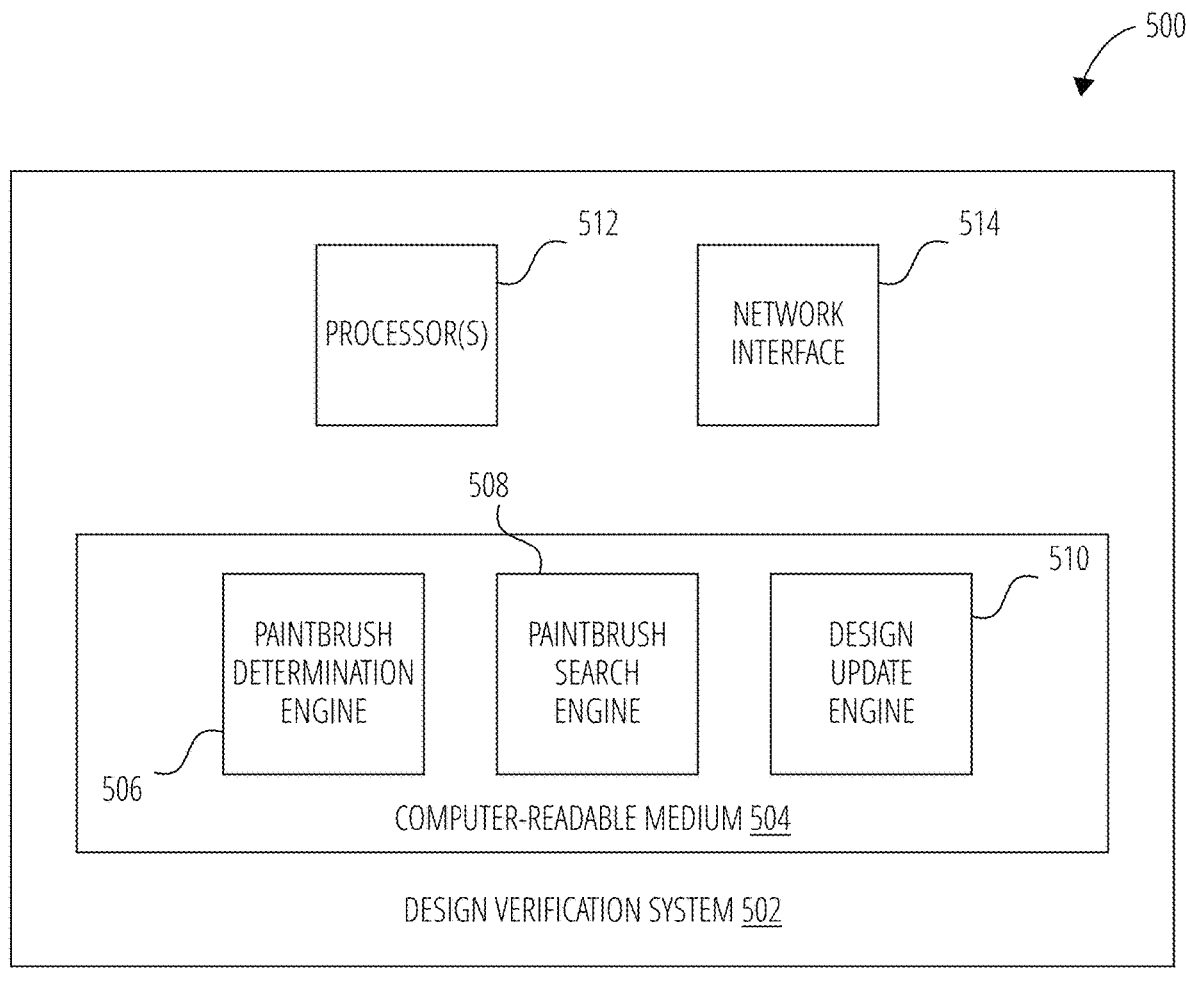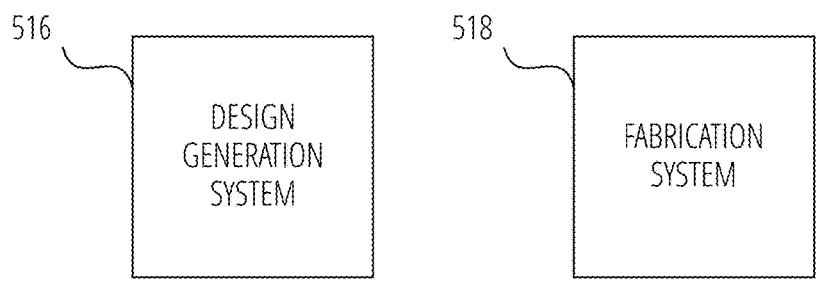
FIG. 5

US 10,885,262 B1

SYSTEMS AND METHODS FOR DETERMINING FABRICATION LOSS OF SEGMENTED DESIGNS USING PAINTBRUSH PATTERNS

TECHNICAL FIELD

This disclosure relates generally to designing devices, and in particular but not exclusively, relates to verifying fabricability of device designs.

BACKGROUND

Optical and electromagnetic devices are devices that create, manipulate, propagate, and/or measure electromagnetic radiation. Their applications vary broadly and include, but are not limited to, wavelength-division multiplexers (WDMs), acousto-optic modulators, optical modulators, optical ring resonators, distributed Bragg reflectors, lasers, lenses, transistors, waveguides, antennas, and the like. Design of these devices is sometimes determined through a simple guess and check method in which a small number of design parameters of a pre-determined design are adjusted for suitability to a particular application. However, in actuality, these devices may have design parameters ranging from hundreds all the way to many billions, dependent on the device size and functionality. As functionality of these optical and electromagnetic devices is increased and manufacturing improves to allow for smaller device feature sizes, it becomes increasingly important to take full advantage of these improvements via optimized device design.

Though some techniques for generating device designs exist, some of these techniques simply generate device designs without considering whether the generated designs can be fabricated. A need exists for techniques for measuring and ensuring the fabricability of device designs.

SUMMARY

In some embodiments, a non-transitory computer-readable medium is provided. The computer-readable medium has computer-executable instructions stored thereon that, in response to execution by one or more processors of a computing system, cause the computing system to perform actions for ensuring fabricability of a segmented design of a physical device. The actions comprise determining a paintbrush pattern and an inverse paintbrush pattern for a first material usable by a fabrication system; processing the segmented design using the paintbrush pattern to obtain a positive paintbrush loss; processing the segmented design using the inverse paintbrush pattern to obtain a negative paintbrush loss; combining the positive paintbrush loss and the negative paintbrush loss to obtain a total paintbrush loss; and in response to determining that the total paintbrush loss indicates that the segmented design is fabricable, providing the segmented design to the fabrication system for fabrication of the physical device.

In some embodiments, a system is provided. The system comprises a fabrication system and at least one computing device. The at least one computing device is configured with logic that, in response to execution by the at least one computing device, cause the at least one computing device to perform actions for ensuring fabricability of a segmented design of a physical device. The actions comprise determining a paintbrush pattern and an inverse paintbrush pattern for a first material usable by the fabrication system; processing the segmented design using the paintbrush pattern to obtain a positive paintbrush loss; processing the segmented design using the inverse paintbrush pattern to obtain a negative paintbrush loss; combining the positive paintbrush loss and the negative paintbrush loss to obtain a total paintbrush loss; and in response to determining that the total paintbrush loss indicates that the segmented design is fabricable, providing the segmented design to the fabrication system for fabrication of the physical device.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

FIG. 5 is a block diagram that illustrates a non-limiting example embodiment of a system according to various aspects of the present disclosure.

DETAILED DESCRIPTION

Figure 1:
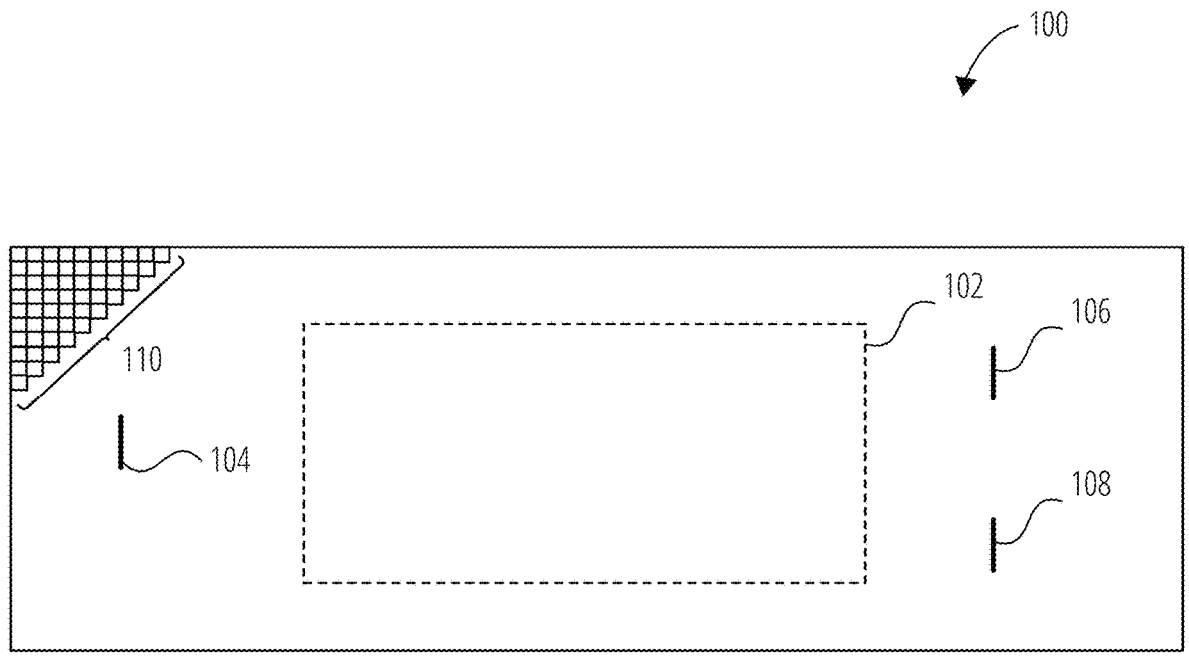
FIG. 1 illustrates an example rendering of a non-limiting example of a simulated environment 100 describing an electromagnetic device according to various aspects of the present disclosure.
Figure 2:
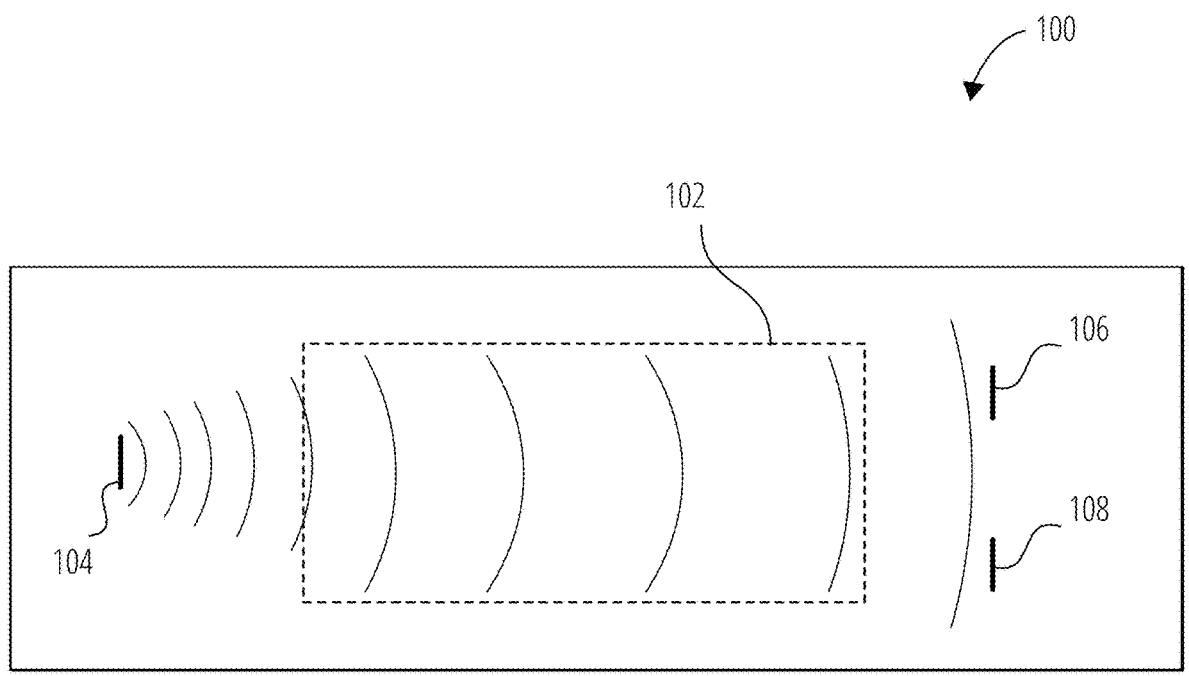
FIG. 2 illustrates a non-limiting example embodiment of a time-forward simulation of the simulated environment describing the electromagnetic device, according to various aspects of the present disclosure.

FIG. 1 and FIG. 2 illustrate an initial set up and a time-forward simulation of a simulated environment for optimizing structural parameters of an electromagnetic device according to various aspects of the present disclosure.

The simulated environment 100 may be used to evaluate performance characteristics of a proposed design for the electromagnetic device.

In the following embodiments, the simulated environment 100 will be described in the context of an optical waveguide as corresponding to the electromagnetic device. However, it is appreciated that the electromagnetic device is not limited to optical waveguides, and that other electromagnetic devices such as lasers, lenses, transistors, optical devices, quantum-dynamic devices, antennas, optoelectronic switches, mechanical structures, and the like may be represented by the term "electromagnetic device." Likewise, though an electromagnetic device is an example of a type of device for which the fabricability of a proposed segmented design may be evaluated using embodiments of the present disclosure, embodiments of the present disclosure are not limited to working with designs for an electromagnetic device. Instead, embodiments of the present disclosure may be used to measure and/or validate the fabricability of a proposed segmented design for any type of device.

A segmented design, as used herein, is a design that is defined by a configuration of a plurality of segments. "Segments" may also be referred to as "pixels" or "voxels" herein. In some embodiments, the segmented design may be a two-dimensional design, wherein the segments are squares arranged in a two-dimensional grid pattern. In some embodiments, the segmented design may be a three-dimensional design, wherein the segments are cubes arranged in a three-dimensional grid pattern. These embodiments are non-limiting examples only, and in other embodiments, the segments may be any other shape, and/or may be laid out in any other pattern. In some embodiments, the segments of a given segmented design may be of heterogenous shapes and/or sizes.

The simulated environment 100 and corresponding initial set up and time-forward simulation may be achieved via a physics simulator. As illustrated in FIG. 1 and FIG. 2, the simulated environment 100 is represented in two-dimensions. However, it is appreciated that higher (e.g., 3-dimensional space) and lower (e.g., 1-dimensional space) dimensionality may also be used to describe the simulated environment 100 and electromagnetic device.

FIG. 1 illustrates an example rendering of a non-limiting example of a simulated environment 100 describing an electromagnetic device according to various aspects of the present disclosure. The simulated environment 100 represents the simulated environment 100 at an initial time step (e.g., an initial set up) for optimizing structural parameters of the electromagnetic device. The electromagnetic device described by the simulated environment 100 may correspond to an optical waveguide having a designable region 102 in which the structural parameters of the simulated environment may be designed, modified, or otherwise changed. The simulated environment 100 includes an excitation source 104 (e.g., a gaussian pulse, a wave, a waveguide mode response, and the like). The electrical and magnetic fields within the simulated environment 100 (and subsequently the electromagnetic device) may change (e.g., field response) in response to the excitation source 104. The electromagnetic device includes a first waveguide output port 106 and a second waveguide output port 108, which may be used for determining a performance parameter or metric of the electromagnetic device in response to the excitation source 104.

As illustrated, the simulated environment 100 (and subsequently the electromagnetic device) is described by a plurality of segments 110, which represent individual elements of the two-dimensional (or three-dimensional) space of the simulated environment. Each of the segments 110 is illustrated in FIG. 1 as two-dimensional squares, however it is appreciated that the segments 110 may be represented as cubes or other shapes in three-dimensional space, or shapes other than squares in a two-dimensional environment. It is appreciated that the specific shape and dimensionality of the plurality of segments 110 may be adjusted dependent on the simulated environment 100. It is further noted that only a portion of the plurality of segments 110 are illustrated to avoid obscuring other aspects of the simulated environment 100.

For simulation purposes, each of the plurality of segments 110 may be associated with at least a structural value to describe the structural parameters, a field value to describe a field response, and a source value to describe the excitation source at a specific position within the simulated environment 100. The field response, for example, may correspond to a vector describing the electric and/or magnetic field at a particular time step for each of the plurality of segments 110. More specifically, the vector may correspond to a Yee lattice to discretize Maxwell's equations for determining the field response. In some embodiments, the field response is based, at least in part, on the structural parameters and the excitation source 104. For design purposes, each of the plurality of segments 110 may be associated with the presence or absence of a material. The material may be deposited or removed during manufacture using a photolithography system, an additive manufacturing system, or any other suitable type of fabrication system.

FIG. 2 illustrates a non-limiting example embodiment of a time-forward simulation of the simulated environment 100 describing the electromagnetic device, according to various aspects of the present disclosure. The rendered simulated environment 100 represents the time-forward simulation at a particular time step in which the excitation source 104 is active (e.g., generating waves originating at the excitation source 104 that propagate through the simulated environment 100). In some embodiments, the electromagnetic device is an optical waveguide operating at a frequency of interest and having a particular waveguide mode (e.g., transverse electromagnetic mode, transverse electric mode, etc.) and the excitation source is at an input of the optical waveguide having a specified spatial, phase, and temporal profile. The time-forward simulation occurs over a plurality of time steps, including the illustrated time step. When performing the time-forward simulation, changes to the field response (e.g., the field value) for each of the plurality of segments 110 are updated in response to the excitation source 104 and based, at least in part, on the structural parameters of the electromagnetic device at each of the plurality of time steps. Similarly, in some embodiments the source value is updated for each of the plurality of segments 110 (e.g., in response to the electromagnetic waves from the excitation source 104 propagating through the simulated environment 100). It is appreciated that the time-forward simulation is incremental and that the field value (and source value) is updated incrementally at each time step as time moves forward for each of the plurality of time steps. It is further noted that in some embodiments, the update is an iterative process and that the update of each field and source value is based, at least in part, on the previous update of each field and source value.

When performing the time-forward simulation, decomposition components from the field response associated with a performance parameter of the electromagnetic device are extracted. In some embodiments, the performance parameter corresponds to the amount of a desired output mode of the first waveguide output port 106 and the second waveguide output port 108. Extracting the decomposition components may correspond to extracting Fourier components of the performance parameter as a function of time. The performance parameter represents power (at one or more frequencies of interest) in the desired mode shape at the specific locations of the first waveguide output port 106 and the second waveguide output port 108. A loss value may subsequently be computed based, at least in part, on a difference between the performance parameter at a time step (e.g. a final time step of the time-forward simulation) and a desired performance value. The loss value may be determined by a loss function which describes the relationship between the performance parameter and the desired performance value. In some embodiments, backpropagation may also be performed in the simulated environment 100, and the time-forward simulation and the backpropagation may be used to improve the performance of the simulated environment 100 by suggesting changes in a design in the designable region 102.

Figure 3:
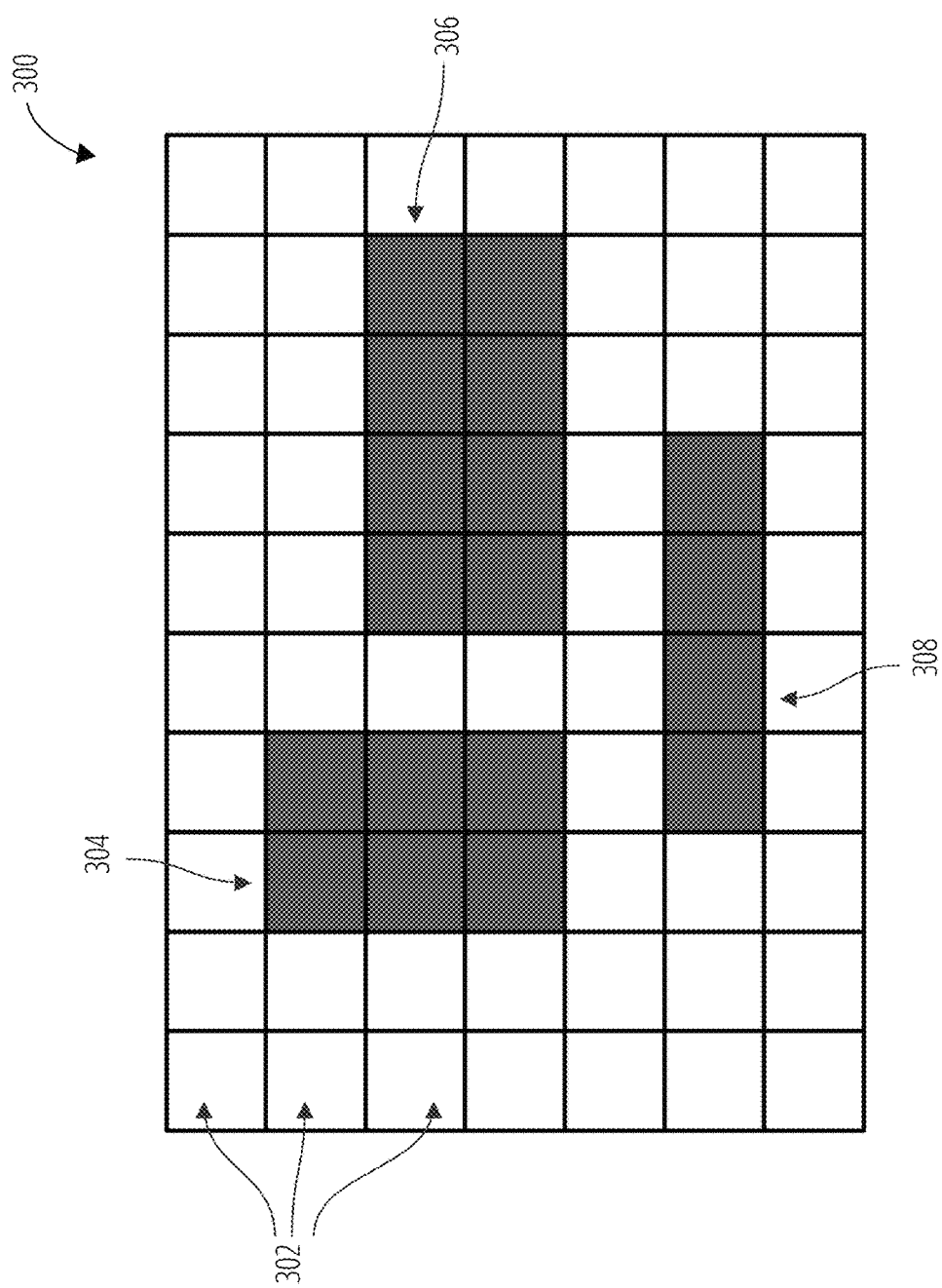
FIG. 3 is a schematic drawing that illustrates a non-limiting example embodiment of a segmented design according to various aspects of the present disclosure.

FIG. 3 is a schematic drawing that illustrates a non-limiting example embodiment of a segmented design according to various aspects of the present disclosure. The segmented design 300 is a non-limiting example of content suitable for insertion in the designable region 102 described above (though not drawn to the scale or with the same granularity of segmentation). As shown, the segmented design 300 includes a plurality of segments 302 laid out in a two-dimensional grid. Each of the segments 302 represents a location in the proposed segmented design that can either include a material or not include a material. As illustrated, segments that are white indicate a lack of the material, and segments that are dark (such as the first pattern 304, the second pattern 306, and the third pattern 308, indicate a presence of the material. For example, in a semiconductor manufacturing process that includes at least one of a photolithography process, a dry etching process, an oxide deposition process, and a planarization process, segments that are white may represent locations that are not exposed, and segments that are dark may represent locations that are exposed during the photolithography process. As another example, in a semiconductor manufacturing process, segments that are black may represent locations in the resulting device that are silicon (Si), and segments that are white may represent locations in the resulting device that are silicon dioxide (SiO2). As yet another example, in an additive manufacturing process (e.g., a 3-D printer), segments that are white may represent locations that do not include material, and segments that are dark may represent locations that do include material.

This description is a non-limiting example only, and in some embodiments, the white and dark segments may have another meaning within the segmented design 300. In some embodiments, the segmented design 300 may include more than two colors. For example, a white segment may indicate a lack of material, a segment in a first color may indicate presence of a first material, and a segment in a second color may indicate a presence of a second material. In some embodiments, the segmented design 300 may be three-dimensional or one-dimensional, instead of the two-dimensional segmented design 300 illustrated in FIG. 3.

Typically, a fabrication system can duplicate any segmented design provided to it, subject to certain constraints such as a minimum feature size, a minimum spacing between features, and other constraints. The fabrication system typically provides a design rule checker that checks proposed designs for compliance with these constraints. The design rule checker typically operates in a contour regime, wherein the points defining the boundaries of the different regions in the segmented design are considered. The design rule checker typically brute forces checking of distances between regions in the proposed designs. While effective, the contour-regime operations performed by a design rule checker are relatively slow, and therefore impractical for use in an iterative inverse design process that repeatedly checks proposed segmented designs for fabricability while revising the design to maximize a performance metric.

In some embodiments of the present disclosure, a "paintbrush pattern" is determined that represents the constraints of the fabrication system. The paintbrush pattern can then be used to analyze a proposed segmented design to determine if the proposed segmented design is fabricable by determining whether the proposed segmented design can be "painted" with the paintbrush pattern.

Figure 4:
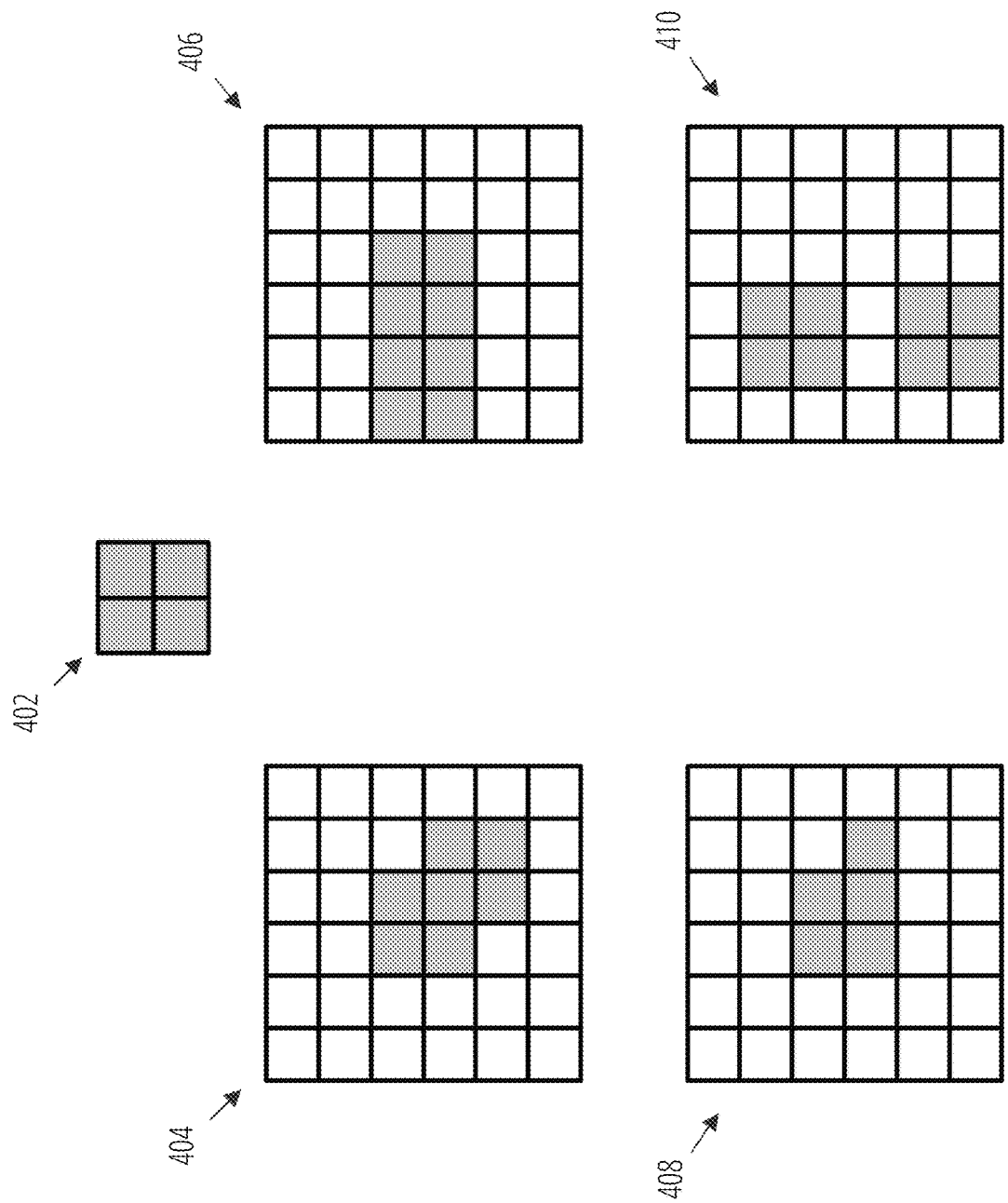
FIG. 4 illustrates several non-limiting examples of proposed segmented designs to be analyzed by a non-limiting example embodiment of a paintbrush pattern according to various aspects of the present disclosure.

FIG. 4 illustrates several non-limiting examples of proposed segmented designs to be analyzed by a non-limiting example embodiment of a paintbrush pattern according to various aspects of the present disclosure. A simple 2×2 paintbrush pattern 402 that is two black pixels wide by two black pixels tall is illustrated at the top of the drawing. In order to determine whether a given proposed segmented design is fabricable, the black pixels of the proposed segmented design are analyzed to determine whether all of the black pixels can be reached by the 2×2 paintbrush pattern 402. Also, an inverse paintbrush pattern (potentially, the same as the 2×2 paintbrush pattern 402, but with the colors inverted (e.g., the black pixels become white pixels)) is determined, and the white pixels of the proposed segmented design are analyzed to determine whether all of the white pixels can be reached by the inverse paintbrush pattern.

A first fabricable segmented design 404 and a second fabricable segmented design 406 are illustrated. These designs can be determined to be fabricable based on the technique described above by showing that all of the black pixels can be reached by the 2×2 paintbrush pattern 402, and that all of the white pixels can be reached by the inverse of the 2×2 paintbrush pattern 402 (it is assumed that the illustrated designs are truncated for clarity, and that further white pixels surround the first fabricable segmented design 404).

A first non-fabricable segmented design 408 and a second non-fabricable segmented design 410 are also illustrated. These designs can be determined to not be fabricable based on the technique described above. For example, in the first non-fabricable segmented design 408, the single black pixel that sticks out at the bottom right of the pattern of black pixels cannot be reached by the 2×2 paintbrush pattern 402. As another example, in the second non-fabricable segmented design 410, the row of single white pixels that separate the black pixels cannot be reached by the inverse of the 2×2 paintbrush pattern 402.

Further details of how techniques such as these can be used to determine whether a proposed segmented design is fabricable are provided below.

FIG. 5 is a block diagram that illustrates a non-limiting example embodiment of a system according to various aspects of the present disclosure. Overall, the illustrated embodiment of the system 500 is configured to generate proposed segmented designs, to establish fabricability of the proposed segmented designs, and to fabricate physical devices based on the proposed segmented designs.

As shown, the system 500 includes a design generation system 516, a fabrication system 518, and a design verification system 502. Communication between the design generation system 516, the design verification system 502, and the fabrication system 518 may occur via a network (not pictured), via exchange of a removable computer-readable medium (not pictured), or via any other suitable technique. Though the design generation system 516, fabrication system 518, and design verification system 502 are illustrated as separate systems, in some embodiments, some portions of these systems may be combined. As one non-limiting example, the design generation system 516 and the design verification system 502 may be combined in a single system. Also, in some embodiments, systems illustrated in FIG. 5 as a single system may be broken into multiple systems.

In some embodiments, the design generation system 516 may include one or more computing devices that are configured to generate segmented designs that achieve a desired result. For example, the design generation system 516 may use forward simulation and backpropagation techniques to generate a segmented design for an electromagnetic device (or any other type of physical device) that has desired characteristics. This is a non-limiting example only, and any other technique, including but not limited to manual design, may be used by the design generation system 516 to create proposed segmented designs.

In some embodiments, the fabrication system 518 may be any suitable system for fabricating a segmented design. In some embodiments, the fabrication system 518 may be a photolithography system or an additive manufacturing system. In some embodiments, the fabrication system 518 may have characteristics that include a minimum feature size, a minimum feature shape, and/or other constraints that help define the segmented designs that the fabrication system 518 is capable of fabricating. To that end, the fabrication system 518 may provide a design rule checker that is configured to process proposed segmented designs in an inefficient legacy manner to determine whether the proposed segmented designs comply with the constraints of the fabrication system 518.

In some embodiments, the design verification system 502 may be any suitable computing device or collection of computing devices configured to provide the described functionality. In some embodiments, the design verification system 502 may be a server computing device, a desktop computing device, a laptop computing device, a mobile computing device, a tablet computing device, or one or more computing devices of a cloud computing system.

As shown, the design verification system 502 includes one or more processors 512, a network interface 514, and a computer-readable medium 504. In some embodiments, the one or more processors 512 may include a plurality of processors and/or a plurality of processing cores in order to provide a large amount of computing power. In some embodiments, the network interface 514 may be configured to communicate with the design generation system 516 and/or the fabrication system 518 via any suitable type of wired network (including but not limited to Ethernet, FireWire, and USB), wireless network (including but not limited to 2G, 3G, 4G, 5G, LTE, Wi-Fi, WiMAX, and Bluetooth), or combinations thereof. In some embodiments, instead of a network interface 514, the design verification system 502 may be configured to communicate with the design generation system 516 and/or the fabrication system 518 via transfer of a removable computer-readable medium (not shown).

As shown, the computer-readable medium 504 has stored thereon logic that, in response to execution by the one or more processors 512, cause the design verification system 502 to provide a paintbrush determination engine 506, a paintbrush search engine 508, and a design update engine 510.

In some embodiments, the paintbrush determination engine 506 is configured to determine one or more paintbrush patterns for a given fabrication system 518. In some embodiments, the paintbrush determination engine 506 may provide test designs to the design rule checker to determine what features would be acceptable, and may use the results of processing the test designs with the design rule checker to determine the one or more paintbrush patterns.

In some embodiments, the paintbrush search engine 508 is configured to analyze proposed segmented designs using the paintbrush patterns generated by the paintbrush determination engine 506 to determine whether the proposed segmented designs could be created by the paintbrush patterns, and thereby are fabricable by the fabrication system 518, as described in detail below. In some embodiments, the design update engine 510 is configured to modify proposed segmented designs that are determined to be not fabricable until they are fabricable, as is also described in further detail below.

As used herein, the term "engine" refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, the term "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage. A computer-readable medium may also include multiple devices configured to collectively store the information described.

Figure 6:
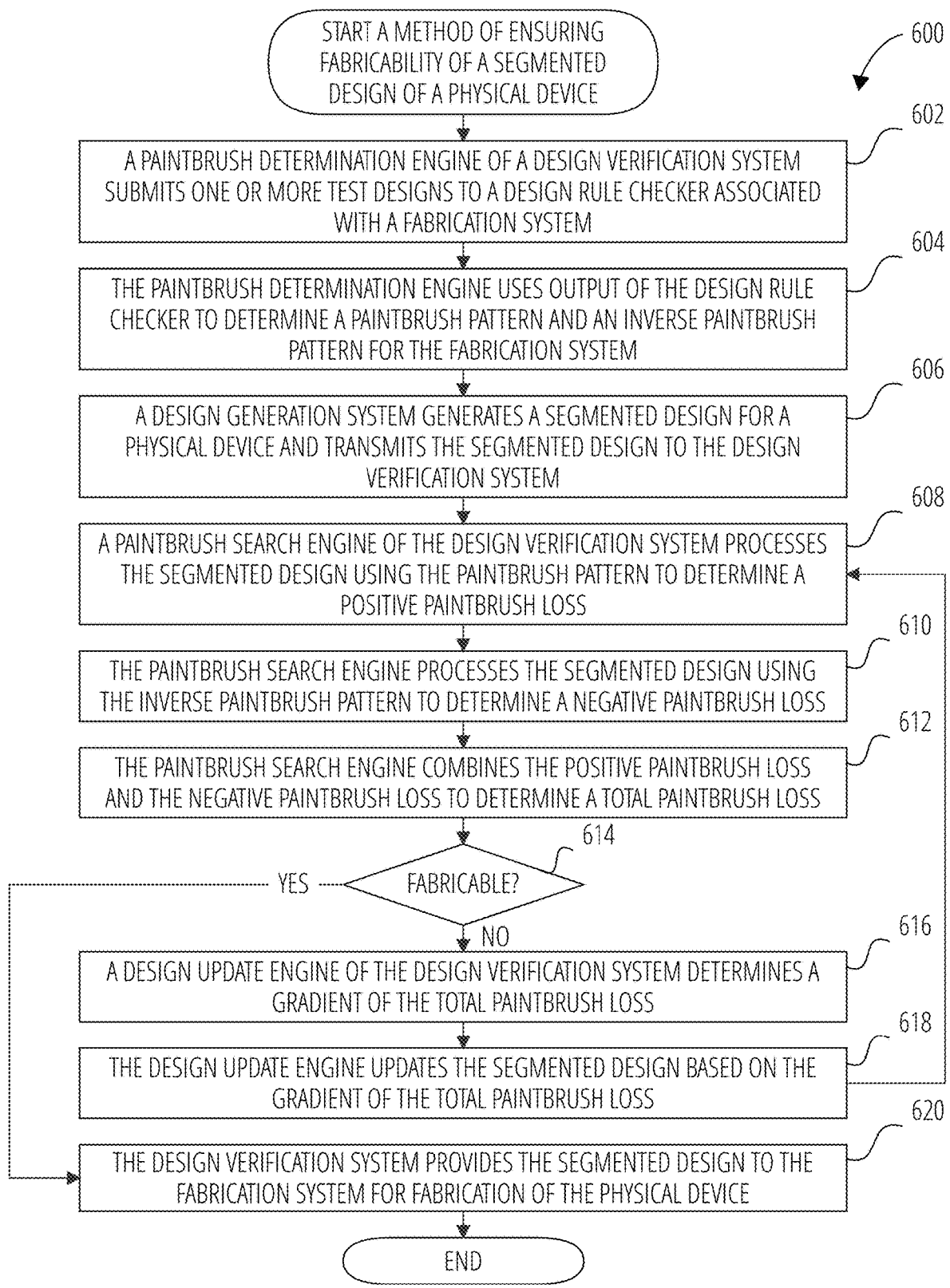
FIG. 6 is a flowchart that illustrates a non-limiting example embodiment of a method of ensuring fabricability of a segmented design of a physical device according to various aspects of the present disclosure.

FIG. 6 is a flowchart that illustrates a non-limiting example embodiment of a method of ensuring fabricability of a segmented design of a physical device according to various aspects of the present disclosure.

From a start block, the method 600 proceeds to block 602, where a paintbrush determination engine 506 of a design verification system 502 submits one or more test designs to a design rule checker associated with a fabrication system 518. In some embodiments, the design rule checker may be software executed by the design verification system 502 or the fabrication system 518. At block 604, the paintbrush determination engine 506 uses output of the design rule checker to determine a paintbrush pattern and an inverse paintbrush pattern for the fabrication system.

In some embodiments, the test designs may include features of varying sizes, varying shapes, and with varying separations between features in order to determine the constraints of the fabrication system 518. In some embodiments, the design rule checker may reject the entire design if a single non-fabricable feature is found. In such cases, each test design may include features of a single size, shape, and separation, and the paintbrush determination engine 506 may use the test designs that are found acceptable to determine the paintbrush pattern. In some embodiments, the design rule checker may indicate features or regions within a design that are determined to be fabricable and non-fabricable, in which case features of multiple sizes, shapes, and separations may be provided in a single test design, and the paintbrush determination engine 506 may analyze the results of processing of the test design to find the constraints for determining the paintbrush pattern.

In some embodiments, the paintbrush pattern represents both the size and shape of the smallest feature resolution of the fabrication system 518. As such, the paintbrush pattern (e.g., a set of black segments) may indicate locations of a first material, and an inverse of the paintbrush pattern (e.g., a set of segments of the same shape as the set of black segments, but with the colors inverted) may indicate the absence of the first material, or locations of a second material. For example, if the fabrication system 518 is a photolithography system, then the black segments may represent silicon (Si), and the white segments may represent silicon dioxide (SiO2). In some embodiments, patterns of different sizes and/or shapes may be used for the paintbrush pattern and the inverse paintbrush pattern. For example, the minimum feature size may be larger than the minimum feature separation, and so a smaller pattern may be used for the inverse paintbrush pattern than the paintbrush pattern.

At block 606, a design generation system 516 generates a segmented design for a physical device and transmits the segmented design to the design verification system 502. The design generation system 516 may generate the segmented design using any automated or manual technique, including but not limited to inverse design.

At block 608, a paintbrush search engine 508 of the design verification system 502 processes the segmented design using the paintbrush pattern to determine a positive paintbrush loss. In some embodiments, the paintbrush search engine 508 creates a convolutional kernel based on the paintbrush pattern, and convolves the convolutional kernel with the segmented design to determine the positive paintbrush loss. For example, for a 2×2 paintbrush pattern, a 3×3 convolutional kernel may be created that has four channels, each of which has the 2×2 paintbrush pattern in a different corner. Each pixel in the segmented design is then compared to the 3×3 convolutional kernel to find the channel that best matches the pixel, and the positive paintbrush loss for that pixel is determined based on the percentage of the 3×3 convolutional kernel pixels that do not match. In some embodiments, this may result in a matrix that stores a positive paintbrush loss value for each pixel of the segmented design. In some embodiments, this positive paintbrush loss value may be constrained to a predetermined range, such as the range [0, 1].

At block 610, the paintbrush search engine 508 processes the segmented design using the inverse paintbrush pattern to determine a negative paintbrush loss. The technique for processing the segmented design may be similar to that of the processing of the paintbrush pattern described in block 608, but with the inverse paintbrush pattern instead of the paintbrush pattern.

At block 612, the paintbrush search engine 508 combines the positive paintbrush loss and the negative paintbrush loss to determine a total paintbrush loss. In some embodiments, the positive paintbrush loss and the negative paintbrush loss may be combined by determining a pixel-wise minimum of the positive paintbrush loss and the negative paintbrush loss. In some embodiments, this minimum may then be multiplied by a factor of 2 to ensure that the values are between 0 and 1.

Figure 7:
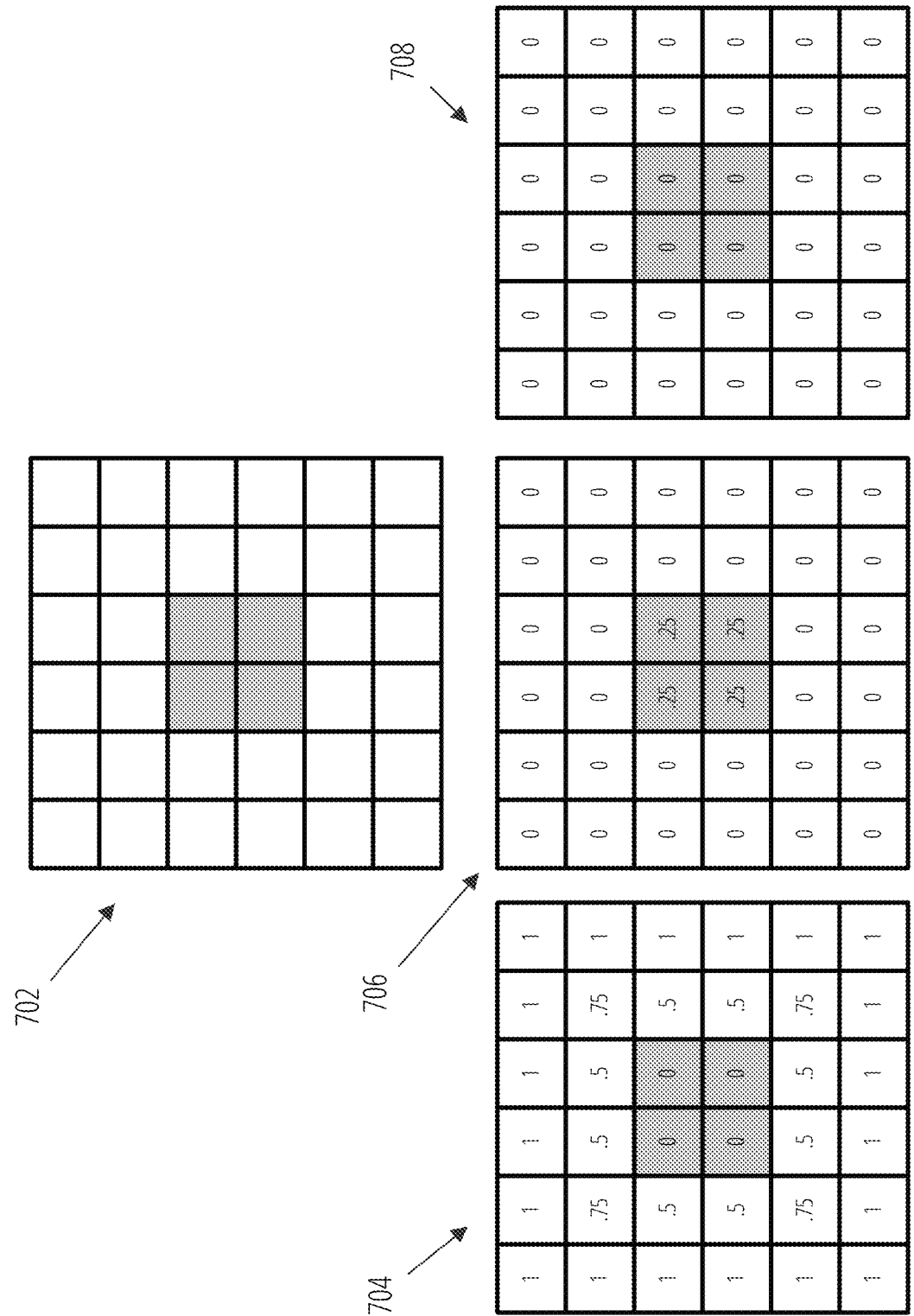
FIG. 7 illustrates a non-limiting example embodiment of computation of positive paintbrush loss, negative paintbrush loss, and total paintbrush loss for a fabricable segmented design according to various aspects of the present disclosure.

FIG. 7 illustrates a non-limiting example embodiment of computation of positive paintbrush loss, negative paintbrush loss, and total paintbrush loss for a fabricable segmented design according to various aspects of the present disclosure. As shown, the first proposed segmented design 702 is a simple pattern that includes one 2×2 feature of black segments in the center of a field of white segments. In the discussion of FIG. 7, a 2×2 paintbrush pattern of black pixels is used as the paintbrush pattern, and a 2×2 pattern of white pixels is used as the inverse paintbrush pattern.

As shown, a first matrix shows the positive paintbrush loss 704 calculated by convolving a 3×3 convolutional kernel based on the 2×2 paintbrush pattern with the first proposed segmented design 702. The positive paintbrush loss for each of the black pixels is zero, while the positive paintbrush loss for the white pixels is of varying non-zero values. A second matrix shows the negative paintbrush loss 706 calculated by convolving a 3×3 convolutional kernel based on the inverse paintbrush pattern with the first proposed segmented design 702. The negative paintbrush loss for each of the white pixels is zero, while the negative paintbrush loss for each of the black pixels is a non-zero value. These values make sense, as the positive paintbrush loss values indicate whether the black pixels are fabricable, and the negative paintbrush loss values indicate whether the white pixels are fabricable. A third matrix shows the total paintbrush loss 708, which is a pixel-wise minimum of the positive paintbrush loss 704 and the negative paintbrush loss 706 (multiplied by a factor of 2). Since for each pixel, either the positive paintbrush loss 704 or the negative paintbrush loss 706 was zero, the total paintbrush loss 708 is zero for each pixel, thus indicating that the first proposed segmented design 702 is fabricable.

Figure 8:
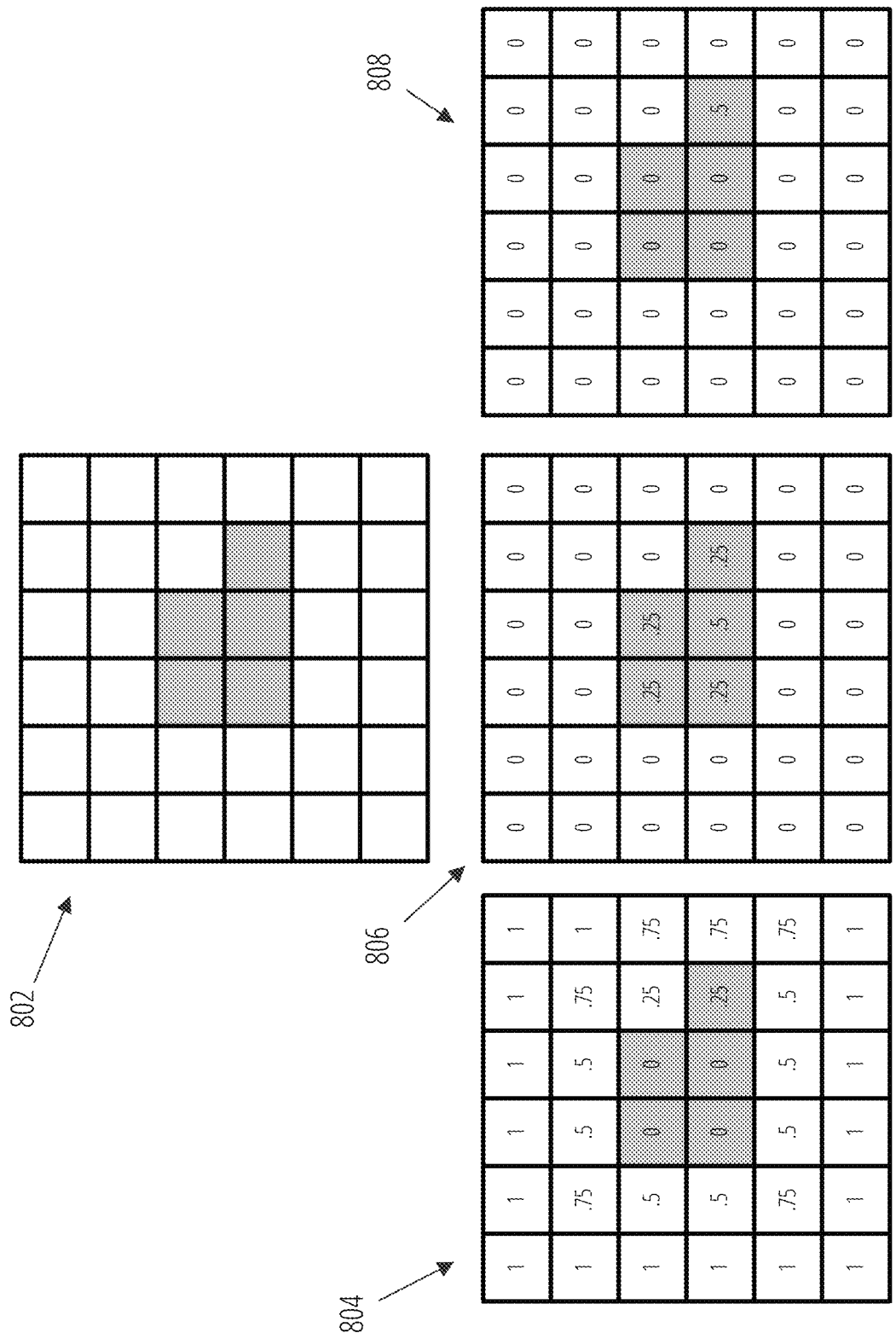
FIG. 8 illustrates a non-limiting example embodiment of computation of positive paintbrush loss, negative paintbrush loss, and total paintbrush loss for a non-fabricable segmented design according to various aspects of the present disclosure.

FIG. 8 illustrates a non-limiting example embodiment of computation of positive paintbrush loss, negative paintbrush loss, and total paintbrush loss for a non-fabricable segmented design according to various aspects of the present disclosure. As shown, the second proposed segmented design 802 is somewhat more complicated than the first proposed segmented design 702 illustrated in FIG. 7, in that the 2×2 pattern of black pixels is extended by a single pixel to the bottom-right. It should be understood that the black pixels are situated in a field of white pixels larger than those shown, but the illustrated field of white pixels is truncated in order to fit within the drawing.

Again, a first matrix shows the positive paintbrush loss 804 calculated by convolving the same 3×3 convolutional kernel based on the 2×2 paintbrush pattern with the second proposed segmented design 802. The positive paintbrush loss for the white pixels is again various non-zero values (as expected for the white pixels). Each of the four black pixels that are the same as the black pixels in the first proposed segmented design 702 again have zero positive paintbrush loss values because they fit within a channel of the 3×3 convolutional kernel. However, the best fit for the new black pixel in the second proposed segmented design 802 would include a single white pixel that cannot be matched by a channel of the 3×3 convolutional kernel. Since 25% of the pixels remain unmatched in the best-case alignment of the 3×3 convolutional kernel with the new black pixel, the positive paintbrush loss value for the new black pixel is 0.25. A second matrix shows the negative paintbrush loss 806 calculated by convolving the 3×3 convolutional kernel based on the inverse paintbrush pattern with the second proposed segmented design 802. Under the assumption that the black features are within a large field of white pixels, it is again shown that the negative paintbrush loss for each of the white pixels is zero, and the negative paintbrush loss for each of the black pixels is a non-zero value. A third matrix shows the total paintbrush loss 808. Because the pixel-wise minimum of the new black pixel is 0.25, the total paintbrush loss for the new black pixel is 0.5 (the pixel-wise minimum, times 2), and since there is a non-zero total paintbrush loss 808, it is indicated that the second proposed segmented design 802 is non-fabricable.

Returning to FIG. 6, the method 600 advances to a decision block 614, where a determination is made regarding whether or not the total paintbrush loss indicates that the segmented design is fabricable by the fabrication system 518. As stated above, if the total paintbrush loss (or any element thereof) is non-zero, then it is indicated that the segmented design is not fabricable.

If it is determined that the total paintbrush loss indicates that the segmented design is not fabricable, then the result of decision block 614 is NO, and the method 600 advances to block 616. At block 616, a design update engine 510 of the design verification system 502 determines a gradient of the total paintbrush loss. In some embodiments, the functions used to analyze the segmented design based on the paintbrush pattern and the inverse paintbrush pattern (such as the convolution functions) are differentiable in order to allow the gradient to be determined. This is an additional distinction between the techniques for determining fabricability in the method 600 versus traditional techniques used by a design rule checker, at least in that traditional design rule checkers do not use differentiable functions.

In some embodiments, the gradient indicates a direction in which the segmented design may be updated in order to bring the segmented design closer to being fabricable. Accordingly, at block 618, the design update engine 510 updates the segmented design based on the gradient of the total paintbrush loss. In some embodiments, the design update engine 510 may use additional factors to update the segmented design as well, including but not limited to a gradient of the performance loss of the segmented design. The method 600 then returns to block 608 to process the updated segmented design. In some embodiments, the method 600 may loop until the segmented design is determined to be fabricable. In some embodiments, the method 600 may detect if the segmented design has converged to a non-fabricable state that is not improving further, in which case the method 600 may terminate without generating a fabricable segmented design.

Returning to decision block 614, if it is determined that the total paintbrush loss indicates that the segmented design is fabricable, then the result of decision block 614 is YES, and the method 600 advances to block 620. At block 620, the design verification system 502 provides the segmented design to the fabrication system 518 for fabrication of the physical device.

The method 600 then proceeds to an end block and terminates.

FIG. 6 illustrates a method 600 that involves a single paintbrush pattern that represents a single material for ease of discussion. However, in some embodiments, multiple paintbrush patterns that each represent a different material may be used. In such embodiments, the method 600 may process each paintbrush pattern separately, and may combine the losses for each separate paintbrush pattern to determine overall fabricability.

Figure 9:
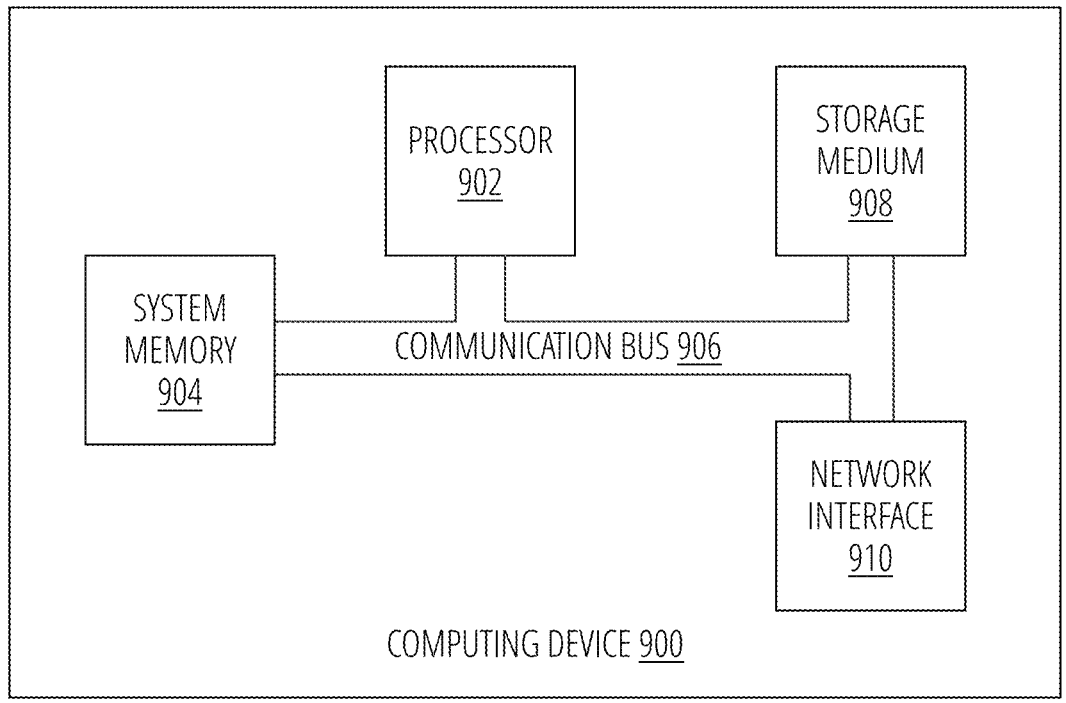
FIG. 9 is a block diagram that illustrates a non-limiting example embodiment of a computing device appropriate for use as a computing device with embodiments of the present disclosure.

FIG. 9 is a block diagram that illustrates aspects of an exemplary computing device 900 appropriate for use as a computing device of the present disclosure. While multiple different types of computing devices were discussed above, the exemplary computing device 900 describes various elements that are common to many different types of computing devices. While FIG. 9 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 900 may be any one of any number of currently available or yet to be developed devices.

In its most basic configuration, the computing device 900 includes at least one processor 902 and a system memory 904 connected by a communication bus 906. Depending on the exact configuration and type of device, the system memory 904 may be volatile or nonvolatile memory, such as read only memory ("ROM"), random access memory ("RAM"), EEPROM, flash memory, or similar memory technology. Those of ordinary skill in the art and others will recognize that system memory 904 typically stores data and/or program modules that are immediately accessible to and/or currently being operated on by the processor 902. In this regard, the processor 902 may serve as a computational center of the computing device 900 by supporting the execution of instructions.

As further illustrated in FIG. 9, the computing device 900 may include a network interface 910 comprising one or more components for communicating with other devices over a network. Embodiments of the present disclosure may access basic services that utilize the network interface 910 to perform communications using common network protocols. The network interface 910 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 910 illustrated in FIG. 9 may represent one or more wireless interfaces or physical communication interfaces described and illustrated above with respect to particular components of the computing device 900.

In the exemplary embodiment depicted in FIG. 9, the computing device 900 also includes a storage medium 908. However, services may be accessed using a computing device that does not include means for persisting data to a local storage medium. Therefore, the storage medium 908 depicted in FIG. 9 is represented with a dashed line to indicate that the storage medium 908 is optional. In any event, the storage medium 908 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 902, system memory 904, communication bus 906, storage medium 908, and network interface 910 are known and commercially available. For ease of illustration and because it is not important for an understanding of the claimed subject matter, FIG. 9 does not show some of the typical components of many computing devices. In this regard, the computing device 900 may include input devices, such as a keyboard, keypad, mouse, microphone, touch input device, touch screen, tablet, and/or the like. Such input devices may be coupled to the computing device 900 by wired or wireless connections including RF, infrared, serial, parallel, Bluetooth, Bluetooth low energy, USB, or other suitable connections protocols using wireless or physical connections. Similarly, the computing device 900 may also include output devices such as a display, speakers, printer, etc. Since these devices are well known in the art, they are not illustrated or described further herein.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having computer-executable instructions stored thereon that, in response to execution by one or more processors of a computing system, cause the computing system to perform actions for ensuring fabricability of a segmented design of a physical device, the actions comprising:
   determining a paintbrush pattern and an inverse paintbrush pattern for a first material usable by a fabrication system;
   processing the segmented design using the paintbrush pattern to obtain a positive paintbrush loss;
   processing the segmented design using the inverse paintbrush pattern to obtain a negative paintbrush loss;
   combining the positive paintbrush loss and the negative paintbrush loss to obtain a total paintbrush loss; and
   in response to determining that the total paintbrush loss indicates that the segmented design is fabricable, providing the segmented design to the fabrication system for fabrication of the physical device.

2. The non-transitory computer-readable medium of claim 1, wherein the actions further comprise, in response to determining that the total paintbrush loss indicates that the segmented design is not fabricable:
   determining a gradient of the total paintbrush loss; and
   updating the segmented design based on the gradient of the total paintbrush loss.

3. The non-transitory computer-readable medium of claim 2, wherein the actions further comprise repeating the actions of processing the segmented design using the paintbrush pattern and the inverse paintbrush pattern, combining the positive paintbrush loss and the negative paintbrush loss to obtain the total paintbrush loss, and, in response to determining that the total paintbrush loss indicates that the segmented design is not fabricable, determining the gradient of the total paintbrush loss and updating the segmented design based on the gradient of the total paintbrush loss until the total paintbrush loss indicates that the segmented design is fabricable.

4. The non-transitory computer-readable medium of claim 1, wherein determining the paintbrush pattern and the inverse paintbrush pattern for the first material usable by the fabrication system includes:
   providing one or more test designs to a design rule checker associated with the fabrication system; and
   determining the paintbrush pattern and the inverse paintbrush pattern based on results generated by the design rule checker for the one or more test designs.

5. The non-transitory computer-readable medium of claim 1, wherein processing the segmented design using the paintbrush pattern to obtain the positive paintbrush loss includes:
   generating a kernel of a convolution operator based on the paintbrush pattern; and
   conducting a convolution of the kernel and the segmented design to obtain the positive paintbrush loss.

6. The non-transitory computer-readable medium of claim 1, wherein processing the segmented design using the inverse paintbrush pattern to obtain the negative paintbrush loss includes:
   generating a kernel of a convolution operator based on the inverse paintbrush pattern; and
   conducting a convolution of the kernel and the segmented design to obtain the negative paintbrush loss.

7. The non-transitory computer-readable medium of claim 1, wherein combining the positive paintbrush loss and the negative paintbrush loss to obtain the total paintbrush loss includes determining a pixelwise minimum of the positive paintbrush loss and the negative paintbrush loss.

8. A system, comprising:
a fabrication system; and
at least one computing device configured with logic that, in response to execution by the at least one computing device, cause the at least one computing device to perform actions for ensuring fabricability of a segmented design of a physical device, the actions comprising:
determining a paintbrush pattern and an inverse paintbrush pattern for a first material usable by the fabrication system;
processing the segmented design using the paintbrush pattern to obtain a positive paintbrush loss;
processing the segmented design using the inverse paintbrush pattern to obtain a negative paintbrush loss;
combining the positive paintbrush loss and the negative paintbrush loss to obtain a total paintbrush loss; and
in response to determining that the total paintbrush loss indicates that the segmented design is fabricable, providing the segmented design to the fabrication system for fabrication of the physical device.

9. The system of claim 8, wherein the fabrication system is a photolithography system.

10. The system of claim 9, wherein the segmented design includes a pattern of pixels that indicate a presence of either silicon (Si) or silicon dioxide ($SiO_2$) to be formed by the photolithography system to create the physical device.

11. The system of claim 8, wherein the physical device is a wavelength-division multiplexer.

12. The system of claim 8, wherein the actions further comprise, in response to determining that the total paintbrush loss indicates that the segmented design is not fabricable:
determining a gradient of the total paintbrush loss; and
updating the segmented design based on the gradient of the total paintbrush loss.

13. The system of claim 8, wherein the actions further comprise repeating the actions of processing the segmented design using the paintbrush pattern and the inverse paintbrush pattern, combining the positive paintbrush loss and the negative paintbrush loss to obtain the total paintbrush loss, and, in response to determining that the total paintbrush loss indicates that the segmented design is not fabricable, determining a gradient of the total paintbrush loss and updating the segmented design based on the gradient of the total paintbrush loss until the total paintbrush loss indicates that the segmented design is fabricable.

14. The system of claim 8, wherein determining the paintbrush pattern and the inverse paintbrush pattern for the first material usable by the fabrication system includes:
providing one or more test designs to a design rule checker associated with the fabrication system; and
determining the paintbrush pattern and the inverse paintbrush pattern based on results generated by the design rule checker for the one or more test designs.

15. The system of claim 8, wherein processing the segmented design using the paintbrush pattern to obtain the positive paintbrush loss includes:
generating a kernel of a convolution operator based on the paintbrush pattern; and
conducting a convolution of the kernel and the segmented design to obtain the positive paintbrush loss.

16. The system of claim 8, wherein processing the segmented design using the inverse paintbrush pattern to obtain the negative paintbrush loss includes:
generating a kernel of a convolution operator based on the inverse paintbrush pattern; and
conducting a convolution of the kernel and the segmented design to obtain the negative paintbrush loss.

17. The system of claim 8, wherein combining the positive paintbrush loss and the negative paintbrush loss to obtain the total paintbrush loss includes determining a pixelwise minimum of the positive paintbrush loss and the negative paintbrush loss.

18. A computer-implemented method for ensuring fabricability of a segmented design of a physical device, the method comprising:
processing, by a design verification system, the segmented design using a paintbrush pattern associated with a fabrication system to obtain a positive paintbrush loss;
processing, by the design verification system, the segmented design using an inverse paintbrush pattern associated with the fabrication system to obtain a negative paintbrush loss;
combining, by the design verification system, the positive paintbrush loss and the negative paintbrush loss to obtain a total paintbrush loss; and
analyzing, by the design verification system, the total paintbrush loss to produce a determination of whether or not the segmented design is fabricable by the fabrication system.

19. The computer-implemented method of claim 18, further comprising determining, by the design verification system, the paintbrush pattern by:
providing, by the design verification system, at least one test design to a design rule checker associated with the fabrication system; and
analyzing, by the design verification system, output of the design rule checker to determine one or more constraints; and
creating, by the design verification system, the paintbrush pattern based on the one or more constraints.

20. The computer-implemented method of claim 18, further comprising, in response to determining that the segmented design is not fabricable by the fabrication system:
determining, by the design verification system, a gradient of the total paintbrush loss; and
updating, by the design verification system, the segmented design based on the gradient of the total paintbrush loss.

\* \* \* \* \*